United States Patent
Chang et al.

(10) Patent No.: US 8,014,182 B2
(45) Date of Patent: Sep. 6, 2011

(54) POWER SUPPLY DEVICE OF CONTROLLING FEEDBACK SYNCHRONIZATION

(75) Inventors: Heng-Chia Chang, Taipei Hsien (TW); Yi-Hua Wang, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 498 days.

(21) Appl. No.: 12/324,667

(22) Filed: Nov. 26, 2008

(65) Prior Publication Data
US 2010/0127674 A1 May 27, 2010

(51) Int. Cl.
*H02M 3/24* (2006.01)
(52) U.S. Cl. .................. 363/97; 363/21.12; 323/266
(58) Field of Classification Search .......... 323/222, 323/247, 251, 266, 267, 268, 282, 285, 290, 323/299
See application file for complete search history.

(56) References Cited

FOREIGN PATENT DOCUMENTS
TW           M244645        9/2004

*Primary Examiner* — Rajnikant Patel
(74) *Attorney, Agent, or Firm* — Muncy, Geissler, Olds & Lowe, PLLC

(57) ABSTRACT

A power supply device of controlling feedback synchronization is connected to an electric power source for obtaining an input power and includes first and second converters for modulating the input power. The first and second converters include first and second output terminals for providing first and second output power respectively. The power supply device further includes a feedback synchronization unit electrically coupled to the first and second output terminals of the first and second converters for obtaining first and second feedback signals, and producing and transmitting a synchronous feedback signal to the second converter according to a voltage difference of the first and second feedback signals to synchronizing output voltage level of the second converter with the first converter. The aforementioned circuit can control the synchronization of a voltage boost time and output time of the first and second converters.

5 Claims, 3 Drawing Sheets

POWER SUPPLY DEVICE OF CONTROLLING FEEDBACK SYNCHRONIZATION

FIELD OF THE INVENTION

The present invention relates to a power supply device of controlling feedback synchronization, and more particularly to a power supply device providing a circuit structure of synchronously outputting a plurality of output power and modulating a plurality of output power.

BACKGROUND OF THE INVENTION

Most power supply devices provide one or more output power to meet a load requirement or generate two output power for a backup or compensation of power. However, a majority of the traditional power supply devices use a tap winding of a transformer or a plurality of winding couplings to achieve the function of providing a plurality of output power to drive different loads. An "Alternate-current distributed power supply device" is disclosed in R.O.C. Pat. No. M244645, FIG. 2 of the patent specification shows the structure of the aforementioned traditional power supply device, and FIG. 5 further discloses a transformer that uses a circuit structure having a plurality of windings to provide different voltages through a multiple of output paths, but the tap winding of the transformer or the structure of a plurality of windings actually involves a complicated manufacturing procedure, slows down the production rate, and increases the cost. To avoid using components of a higher cost, manufacturers provide another multi-output power circuit structure that uses two converters for generating two output power as shown in FIG. 1. FIG. 1 shows a circuit block diagram of a traditional power supply device, wherein the power supply device is connected to an electric power source 1 for obtaining input power. After going through a rectifier unit 2 and a power correction unit 3, the power correction unit 3 obtains the input power and modulates its voltage or power factor. The power correction unit 3 is connected to a first converter 4 and a second converter 5, and the first and second converters 4, 5 obtain the input power from the power correction unit 3 to generate a first output power and a second output power and output the first and second power from a first output terminal 41 and a second output terminal 51 respectively. The first and second converters 4, 5 obtain a feedback signal from the first output power or the second output power to control the output timing and power independently. Although the power supply devices can back up each other independently to avoid the use of components of a higher cost, theoretically the output timing of the two converters should be synchronous, and the boost time and step-down time of the voltage of the first output power and the second output power should be equal, yet there is a time difference between the timings of the voltages of the two converters from the startup to the final stage, so that the boost time and the step-down time cannot be synchronized. Obviously, the prior art requires improvements.

SUMMARY OF THE INVENTION

In view of the foregoing shortcoming of the prior art, the present invention overcomes the foregoing shortcomings and avoiding the deficiency by providing a circuit structure to change the output timing of two converters in the power supply device for synchronizing output of the two converters.

To achieve the foregoing objective, the present invention provides a power supply device of controlling feedback synchronization, wherein the power supply device is connected to an electric power source for obtaining input power, and includes a first converter and a second converter for modulating the input power, and the first converter and the second converter include a first output terminal and a second output terminal to provide a first output power and a second output power respectively, and the power supply device further comprises a feedback synchronization unit electrically coupled to the first output terminal and the second output terminal of the first and second converters for obtaining a first feedback signal and a second feedback signal respectively, and generating and transmitting a synchronous feedback signal to the second converter according to a voltage difference of the first feedback signal and the second feedback signal, and the synchronous feedback signal is limited by the voltage level of the first feedback signal, such that when the power supply device is turned on, the synchronous feedback signal obtained by the second converter is limited by the first feedback signal to further limit the boost output timing of the second converter to synchronize with the first converter. The aforementioned circuit can control the synchronization of the voltage boost time and the output time of the second converter and the first converter.

DETAILED DESCRIPTION OF THE PREFERRED EMBODIMENTS

The technical contents of the invention will now be described in more detail hereinafter with reference to the accompanying drawings that show various embodiments of the invention.

Figure 1:
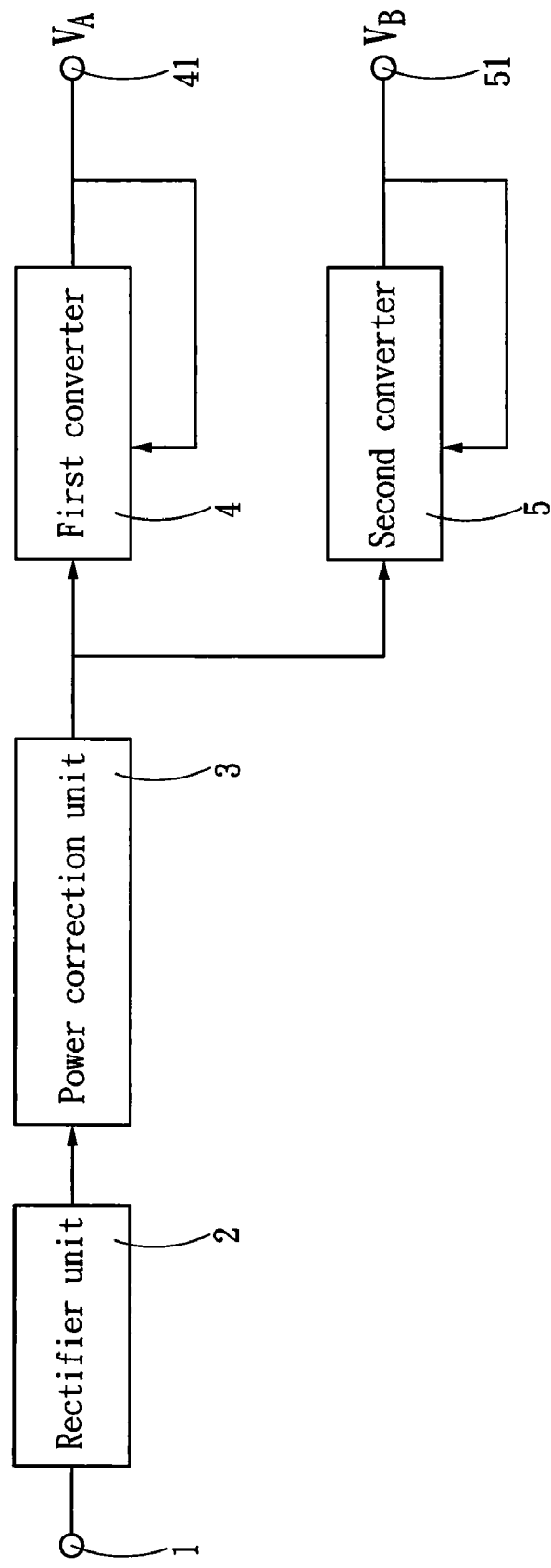
FIG. 1 is a circuit block diagram of a traditional power supply device.
Figure 2:
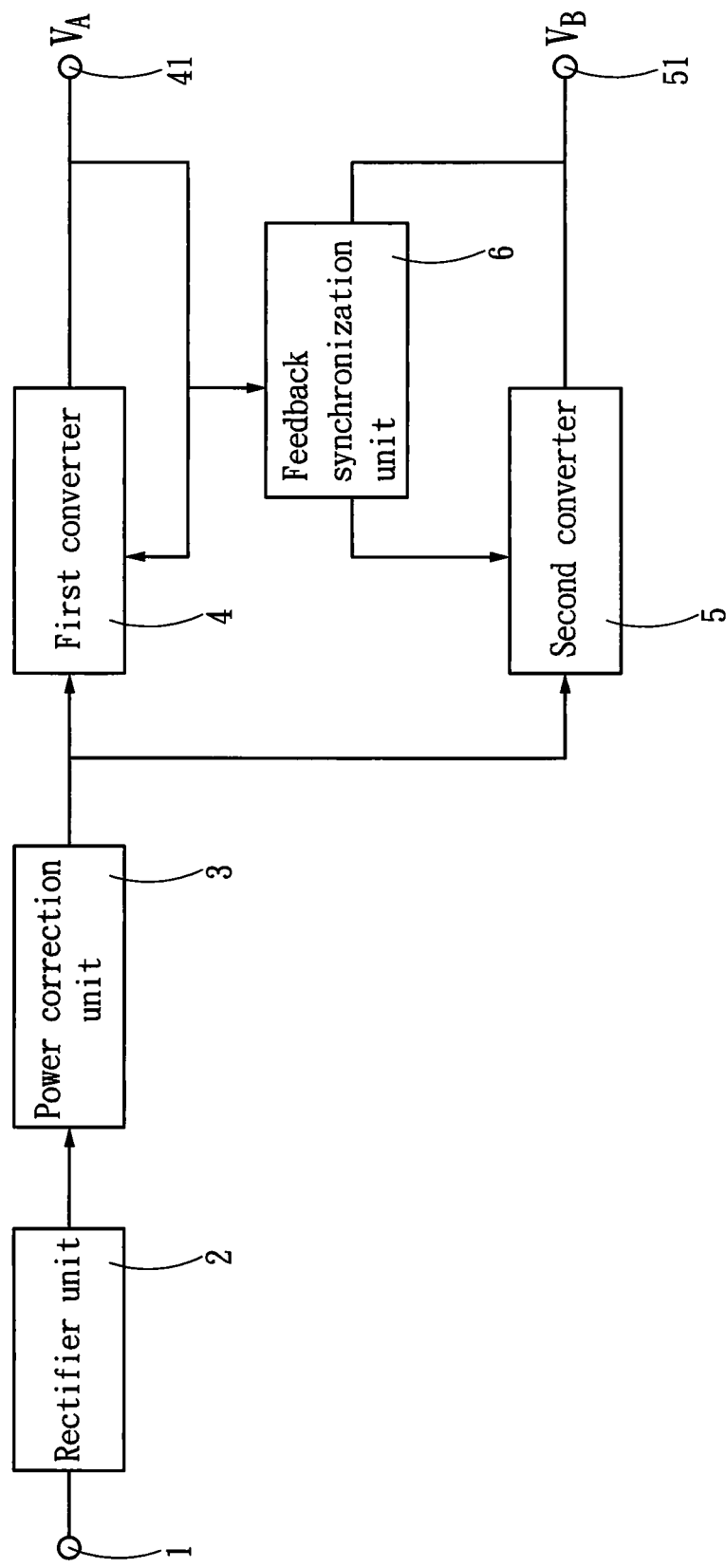
FIG. 2 is a circuit block diagram of a circuit structure in accordance with the present invention.

With reference to FIG. 2 for a circuit structure of the present invention, a power supply device comprises a rectifier unit 2, a power correction unit 3, a first converter 4 and a second converter 5, wherein the rectifier unit 2 and the power correction unit 3 obtain input power from an electric power source 1, and the power correction unit 3 modulates the voltage or the power factor of the input power, and the modulated power is converted by the first converter 4 to provide a first output power and output the first output power through a first output terminal 41. The second converter 5 includes a second output terminal 51 for providing a second output power, wherein the first and second converters 4, 5 obtain feedbacks to modulate the output power according to the first output terminal 41 and the second output terminal 51. In a preferred embodiment, the voltage at the first and second output terminals 41, 51 is detected, such that if the voltage is too high, then the first and second converters 4, 5 will reduce the output voltage, or else increase the output voltage. If the power supply device is triggered and turned on, the first converter 4 and the second converter 5 must start a boost timing to modulate and boost the input power of the first output power and the second output power to a predetermined voltage level to synchronizing output of the first and second converters 4, 5. The present invention further comprises a feedback synchronization unit 6 electrically coupled to the first and second converters 4, 5, and the feedback synchronization unit 6 is coupled to the first output terminal 41 and the second output terminal 51 for obtaining a first feedback signal and a second feedback signal, and the feedback synchronization unit 6 generates and transmits a synchronous feedback signal to the second converter 5 according to a voltage difference of the first feedback signal and the second feedback signal to drive the second converter 5 to modulate a voltage level of the second output power during the boost period and synchronize the first output power. More specifically, the feedback synchronization unit 6 determines the difference of the first and second feedback signals, and the voltage level of the first feedback signal is used for limiting and modulating the second feedback signal to the synchronous feedback signal, so that the synchronous feedback signal is limited within a voltage range of a first synchronous signal. With the feedback control of the first feedback signal and the synchronous feedback signal, the voltage of the first converter 4 and the second converter 5 can be modulated and boosted to synchronously output the first output power and the second output power to the first and second output terminals 41, 51.

Figure 3:
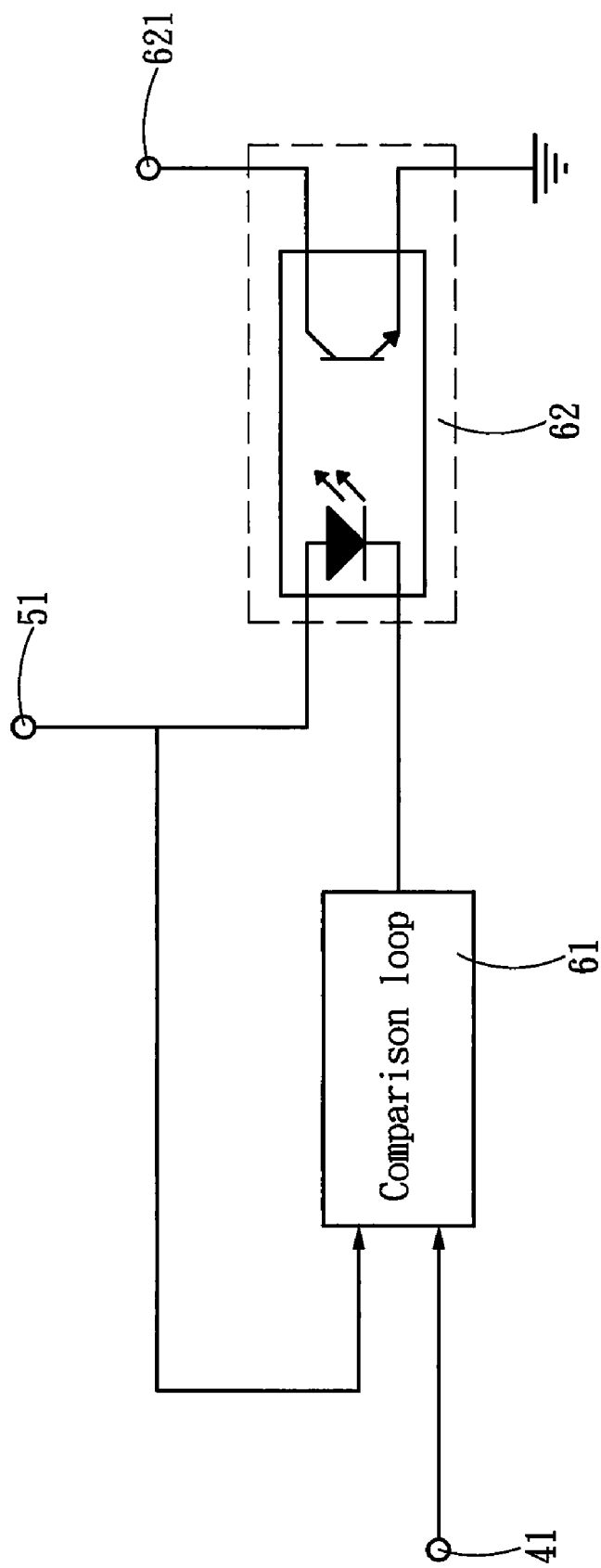
FIG. 3 is a schematic view of a feedback synchronization unit in accordance with a preferred embodiment of the present invention.

With reference to FIG. 3 for a feedback synchronization unit 6 in the aforementioned circuit structure in accordance with a preferred embodiment of the present invention, the feedback synchronization unit 6 comprises a comparison loop 61 and a coupling loop 62, wherein the comparison loop 61 is coupled to the first and second output terminals 41, 51 for obtaining the first and second feedback signals, and the comparison loop 61 modulates the voltage difference of the first and second feedback signals to output a level limit signal, wherein if the comparison loop 61 determines that the first feedback signal is greater than the second feedback signal, the level limit signal is directly proportional to the voltage difference of the first and second feedback signals, and if the first feedback signal is smaller than the second feedback signal, the output of the level limit signal is cut off, and the coupling loop 62 modulates the voltage difference of the level limit signal and the second feedback signal to output the synchronous feedback signal. More specifically, the coupling loop 62 is formed by respectively connecting two input terminals of an optical coupling component to the second converter 5 and the comparison loop 61, and the optical coupling component obtains the level limit signal and the second feedback signal, and the voltage difference of the level limit signal and the second feedback signal determines the current passing through two output terminals of the optical coupling component to generate the synchronous feedback signal at a feedback signal output terminal 621 of the optical coupling component, and the feedback signal output terminal 621 is connected to the second converter 5 for providing the synchronous feedback signal to control the boost speed after the second converter 5 is turned on.

With the foregoing circuit structure, the voltage of the level limit signal increases with an increased voltage difference if the first feedback signal is greater than the second feedback signal. Since the voltage of the level limit signal boosts, the current passing through the optical coupling component becomes smaller, and finally the current passing through the optical coupling component is directly proportional to the synchronous feedback signal. The higher the voltage of the level limit signal, the smaller the voltage of the synchronous feedback signal. The second converter 5 modulates its output power according to the synchronous feedback signal by increasing its output power when the voltage of the synchronous feedback signal is determined to be lowered. In short, if the first feedback signal is greater than the second feedback signal, it means that the first converter 4 is boosted to a voltage higher than the second converter 5, and the synchronous feedback signal is modulated to drive the second converter 5 to increase the output power for a faster boost speed of the second converter 5 to synchronize with the first converter 4. On the other hand, if the first feedback signal is smaller than the second feedback signal, it means that the boost speed of the second converter 5 exceeds the first converter 4, and the comparison loop 61 will stop outputting the level limit signal, so that the synchronous feedback signal rises to reduce the boost speed of the second converter 5. When the aforementioned circuit controls the startup of the power supply device, two different converters limit each other to give a substantially equal boost speed, so as to achieve the synchronous output effect.

In summation of the description above, the present invention improves over the prior art and complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. A power supply device of controlling feedback synchronization, and the power supply device being connected to an electric power source for obtaining an input power, and including a first converter and a second converter for modulating the input power, and a boost timing being started for boosting the obtained input power to produce and transmit a first output power and a second output power to a first output terminal and a second output terminal respectively, after the first converter and the second converter are turned on, and the power supply device further comprising:

a feedback synchronization unit, electrically coupled to the first and second converters, and coupled to the first output terminal and the second output terminal for obtaining a first feedback signal and a second feedback signal respectively, and producing and transmitting a synchronous feedback signal to the second converter according to a voltage difference of the first feedback signal and the second feedback signal, such that a voltage level for driving the second converter to modulate the second output power in a boost period is synchronous with the first output power.

2. The power supply device of controlling feedback synchronization as recited in claim 1, wherein the feedback synchronization unit comprises a comparison loop coupled to the first and second output terminals for obtaining the first and second feedback signals respectively, and a coupling loop coupled to the comparison loop and the second output terminal, and the comparison loop modulates the voltage difference of the first and second feedback signals to output a level limit signal, and the coupling loop modules the voltage difference of the level limit signal and the second feedback signal to output the synchronous feedback signal.

3. The power supply device of controlling feedback synchronization as recited in claim 2, wherein the level limit signal is directly proportional to the voltage difference of the first and second feedback signals if the first feedback signal is greater than the second feedback signal, and the output of the level limit signal is cut off if the first feedback signal is smaller than the second feedback signal.

4. The power supply device of controlling feedback synchronization as recited in claim 2, wherein the coupling component is an optical coupling component, and the voltage difference of the level limit signal and the second feedback signal determines a current passing through an input terminal of the coupling component, and further generates the synchronous feedback signal at a feedback signal output terminal of the coupling component.

5. The power supply device of controlling feedback synchronization as recited in claim 1, wherein the first converter and the second converter modulate their output power according to the first feedback signal and the synchronous feedback signal respectively.

* * * * *